United States Patent [19]

Neff

[11] Patent Number: 4,982,697
[45] Date of Patent: Jan. 8, 1991

[54] AQUATIC NET PEN AND METHOD

[76] Inventor: Gregor N. Neff, 85 Myrtle Ave., Dobbs Ferry, N.Y. 10522

[21] Appl. No.: 135,781

[22] Filed: Dec. 21, 1987

[51] Int. Cl.$^5$ ............................................. A01K 61/00
[52] U.S. Cl. ....................................................... 119/3
[58] Field of Search ........................ 119/3, 2, 4; 43/55, 43/56, 57, 102, 103, 104, 105; 135/115, 119; 296/100, 101; 52/3; 160/378, 390, 404; 220/369, 370, 200, 315; 209/391

[56] References Cited

U.S. PATENT DOCUMENTS

| 1,588,224 | 6/1926 | Hoel | 43/103 |
| 3,314,396 | 4/1967 | Willinger | 119/5 |
| 3,561,402 | 2/1971 | Ishida et al. | 119/3 |
| 3,658,034 | 4/1972 | Day et al. | 119/4 X |
| 3,727,972 | 4/1973 | Belk | 135/115 X |
| 4,003,338 | 11/1977 | Neff et al. | 119/3 |
| 4,079,698 | 3/1978 | Neff et al. | 43/55 X |
| 4,429,659 | 2/1984 | Holyoak | 119/3 |
| 4,699,086 | 10/1987 | Mori | 119/3 |
| 4,703,719 | 11/1987 | Mori | 119/3 |

FOREIGN PATENT DOCUMENTS 2091071 7/1982 United Kingdom .................... 119/3

OTHER PUBLICATIONS

Book: "Fisheries Technologies for Developing Countries", National Academy Press, Washington, D.C. 1988, (pp. 116 and 117).

Primary Examiner—Robert P. Swiatek
Assistant Examiner—Nicholas D. Lucchesi
Attorney, Agent, or Firm—Gregor N. Neff

[57] ABSTRACT

A net pen or cage for containing aquatic animals. The pen has a light-weight inexpensive net cover for the top which keeps predators out. The cover is easy to apply and remove and yet is held securely in place by means of studs or posts extending upwardly from the frame of the cage or pen and having enlarged heads which preferably are slightly larger than the holes in the mesh. Preferably the mesh is made up of resilient plastic strands which snap back into their original shape after being deformed by the bolt-heads passing through, so that the bolt heads and the netting together form a snap-fitting fastening system. In one embodiment, panels of materials such plastic netting are suspended in cages so as to attract the growth of algae thereon for feeding algae-eating aquatic animals such as conch, fish, etc. in the cages. The panels are formed into a removable unit so that some of the units and can be suspended in water elsewhere and transferred to the cage to replace units from which the algae has been depleted, thus feeding the aquatic animals by merely replacing algae-depleted units with algae-loaded units.

18 Claims, 3 Drawing Sheets

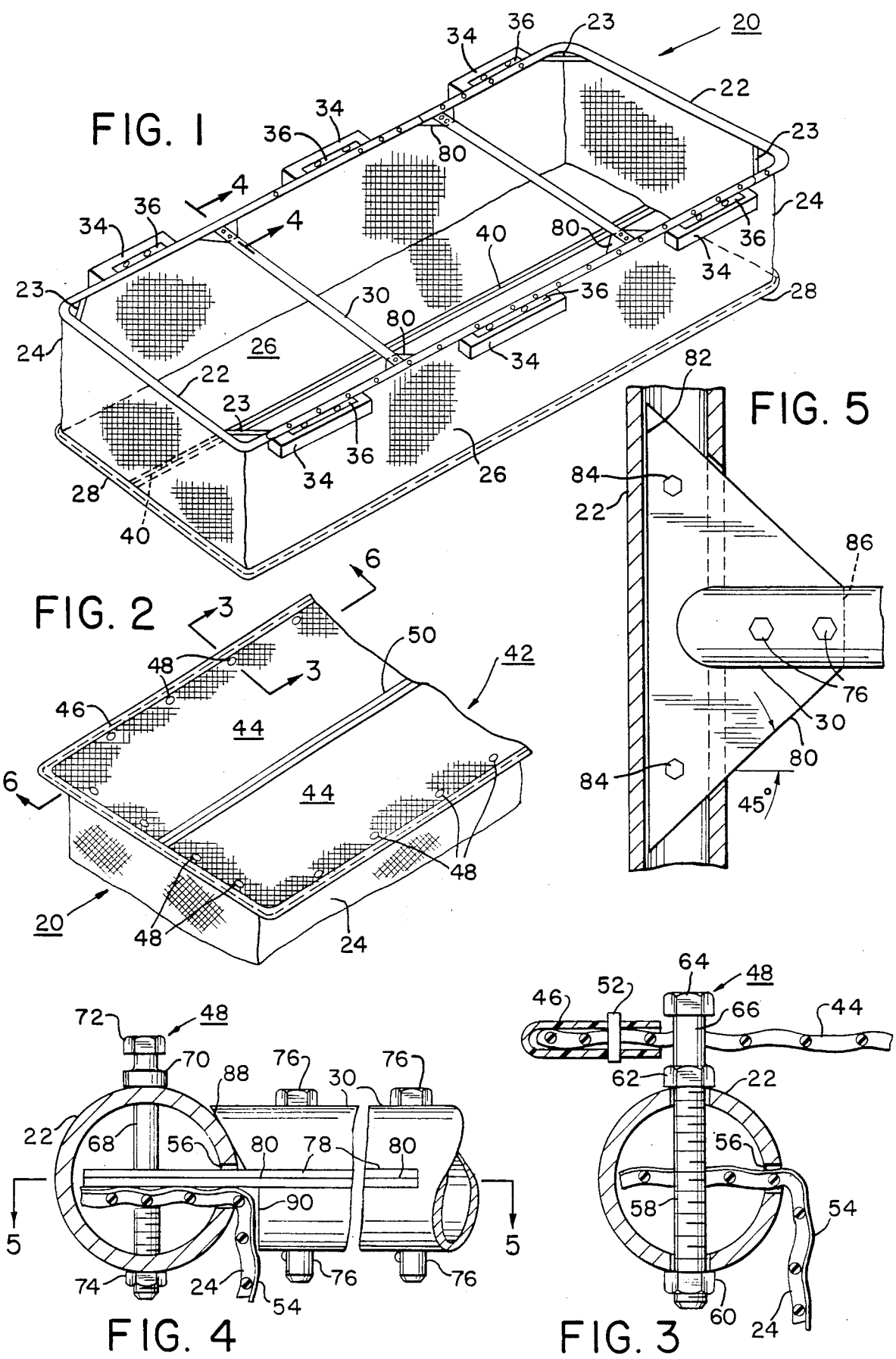

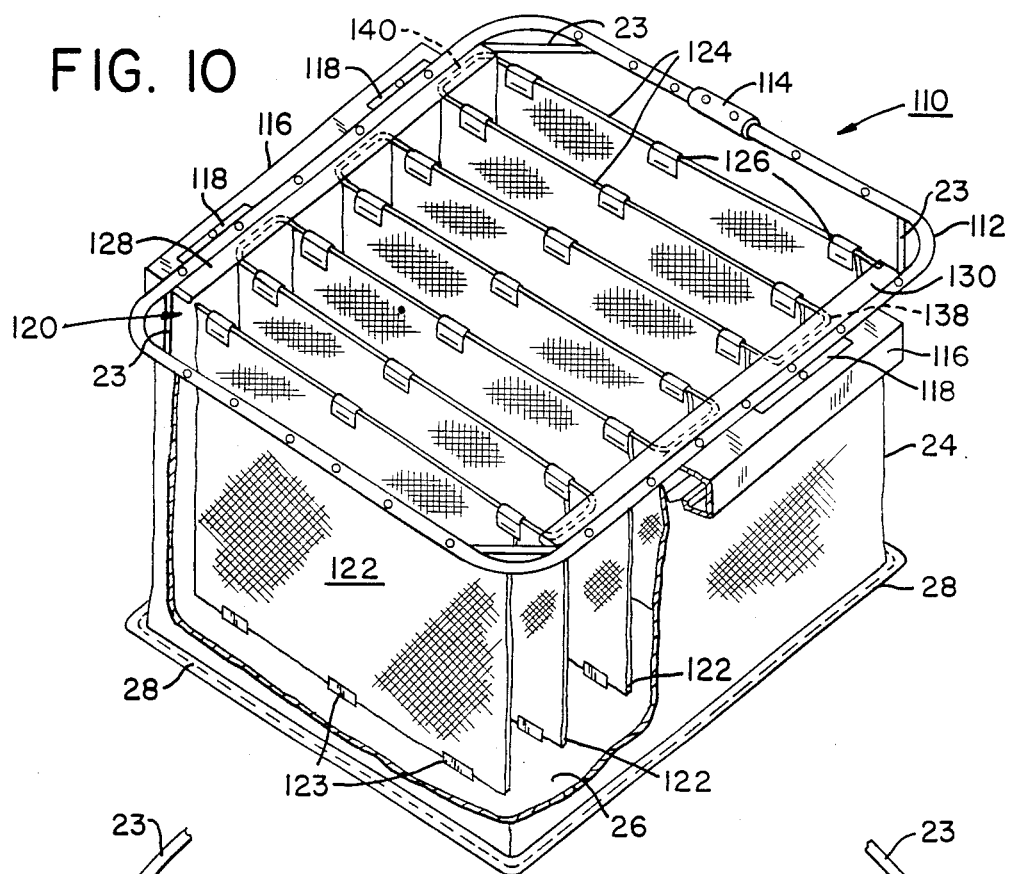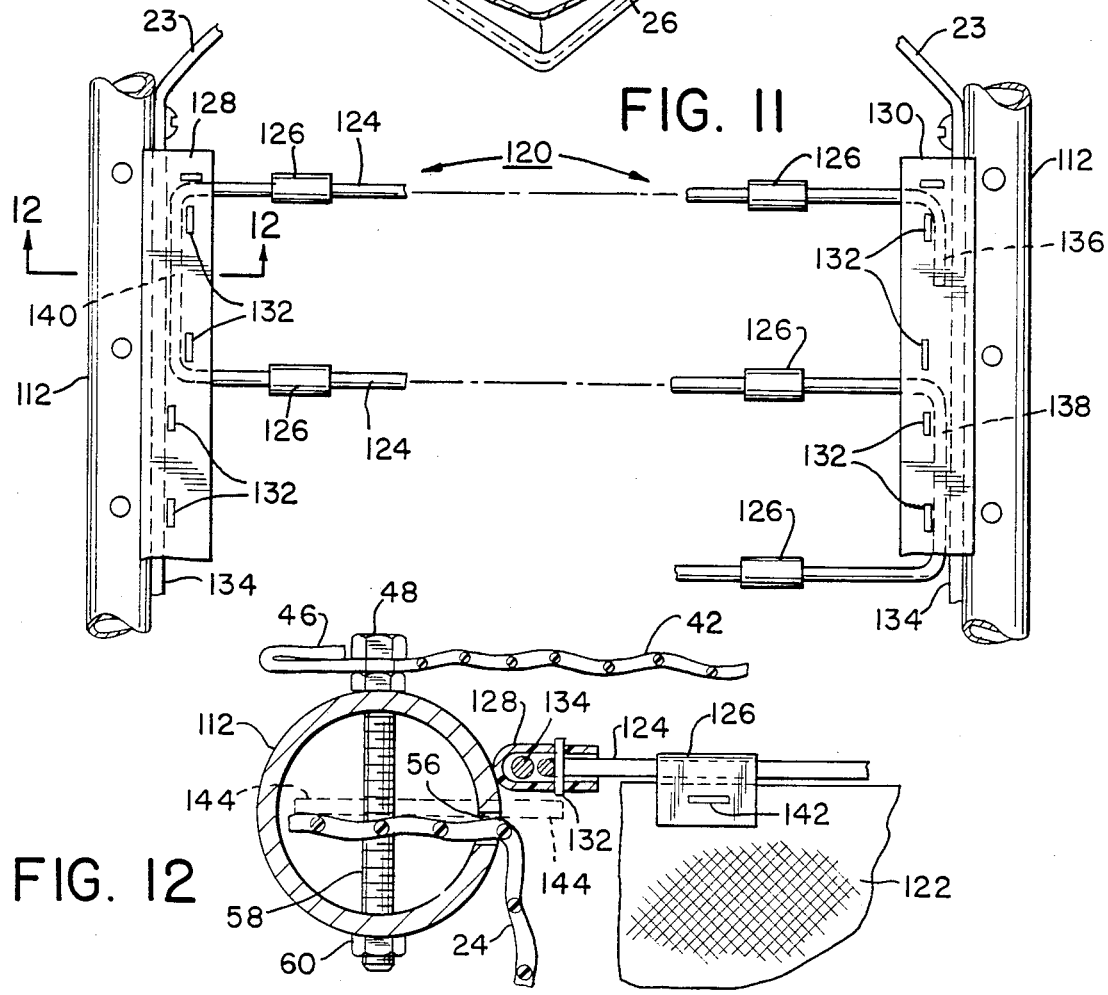

AQUATIC NET PEN AND METHOD

This invention relates to cages or net pens and methods for containing and/or growing aquatic animals, and to structures for growing aquatic vegetation to feed to aquatic animals.

The terms "cage" and "net-pen" often are used interchangeably to mean any enclosure for containing or growing aquatic animals, and those terms will be used interchangeably herein. Quite often, however, the term "net-pen" is used to describe relatively large structures, whereas "cage" is used to describe relatively small structures.

Many smaller cages or net-pens have integral solid tops. For example, U.S. Pat. Nos. 4,003,338 and 4,079,698, of which the inventor herein is a co-inventor, show cages with aluminum sheet metal tops and lids. Such tops are highly desirable. If the cage top is not very large, e.g., four feet by four feet, such tops are practical too. However, such tops are relatively expensive and the sheet metal tops cannot easily be removed.

When the size of the cage or net-pen top gets relatively large, e.g., eight feet by eight feet, integral solid tops are less practical. They can be relatively heavy and difficult to support over long spans. Furthermore, the amount of metal or other solid materials required can make the cost of such tops relatively high. For this reason, many net-pens in the past have had removable netting tops in order to keep out predators. The problems with such netting tops, however, are significant. Usually the tops are made out of materials such as nylon or cotton netting such as that used in fishing nets or similar nets. Such netting is relatively short-lived. As a result, the netting should be replaced relatively frequently, thus increasing considerably the expense of maintaining the net-pens. Also, such netting sometimes tangles when it is removed and then replaced.

Integral tops made partially of plastic netting also have been used and are shown in the above-mentioned U.S. Pat. No. 4,079,698. However, those tops are bolted into the cage frame and are not easy to take off or install.

Another problem with netting tops for cages and net-pens is in the means used for securing the netting to the cage. The securing means should be relatively inexpensive and yet securely hold the netting material in place, and easily release it when the top is to be removed.

Accordingly, it is ar object of the invention to provide a cage or net pen with a netting cover or top which eliminates or alleviates the foregoing problems. it is a further object to provide such a top which is easy to put on and remove, which is highly resistant to deterioration in sunlight and other weather elements, which is relatively dimensionally stable, and which stays in place well. Furthermore, it is an object to provide a relatively inexpensive securing structure and fasteners to fasten such a top in place.

A perennial problem in the cage culture of aquatic animals is in feeding them. The feeding of algae-eating aquatic animals has posed a particular problem. In the past, caged animals have had algae gathered elsewhere and brought to the cage for eating. In doing this, one prior method is to grow algae on black polyethylene netting such as that sold under the trademark "Vexar" and other marks. It is believed that the algae so grown has been gathered from panels of Vexar mounted in frames, and then delivered elsewhere to feed the aquatic animals. This procedure is cumbersome, time consuming and labor-intensive.

It is a further object of the invention to provide a cage structure and method which facilitates feeding algae-eating aquatic animals in the cages and greatly reduces labor and time needed to gather the algae needed for the animals. It is another object to provide a relatively simple and inexpensive algae-growing structure.

In accordance with the present invention, the foregoing objects are met by the provision of a net-pen or cage with a frame defining an opening to the inside of the cage, and studs extending out of the frame with each stud having an enlarged portion. Netting with resilient strands is used as a cover, with the netting holes being smaller than the enlarged portions on the studs. When the cover is put on, the enlarged portions on the studs are forced through the holes, and the strands are deformed temporarily to allow the enlarged portions to pass through the holes. Then the resiliency of the netting material returns the strands to a position underneath the enlarged portions of the studs. Thus, in effect snap-fasteners are formed all the way around the frame to hold the cover in place, and the cover can be "snapped" on or off very easily.

Preferably, the cover is made of weather-resistant black polyethylene netting which has the desired resilience. It also is preferred that the netting have a border around it to protect the netting edges, to protect the hands of people from contact with the sharp edges of the netting, to facilitate handling of the cover, and to strengthen the fastening system.

In accordance with another aspect of the invention, in a preferred embodiment, the cage frame is hollow and has spaced fasteners such as bolts which are used to hold the netting fabric in a slot in the hollow frame. Preferably, the studs used to hold the netting top are merely extensions of those bolts, and the enlargements comprise the heads of the bolts. Thus, the bolts are used for the dual purpose of securing the netting walls to the frame, and securing the cover in place.

It is also an advantage of the invention that it provides a net-pen or cage with crossbar supports which are easily removable. The crossbar supports hold up the netting cover when it is in place, and can be easily removed without tools so that the top of the cage is entirely open to facilitate harvesting and other activities in which the top of the cage should be open.

Also in accordance with the invention, a cage is provided which is specially adapted to feed algae to algae-eating aquatic animals such as crustaceans, molluscs and fish. The cage has at leas&. one panel of algae-growth-inducing material in it in a position where the animals can reach it and graze on the algae which grows on the panel. The panel can be made of materials such as black polyethylene netting, which is a material highly conducive to the growth of algae. Preferably, a plurality of such panels is provided in the form of a unitary structure which can be easily inserted into the cage or lifted out of it. The structure can be used independently as a simple, low-cost algae growing structure.

In accordance with the preferred method of the present invention, algae-growing assemblies can be placed in the water outside of the cages until a substantial amount of algae accumulates on them and then, when the algae on the panels in the cage has been depleted by the animals, the depleted unit can be replaced with a new unit loaded with algae. This process can be repeated as often as needed in order to feed large amounts of algae to the animals by merely exchanging panel units. Thus, animals such as conch, lobsters, tilipia, crayfish, white amur and other algae-eating aquatic animals can be grown with less effort and expense.

The foregoing and other objects and advantages of the invention will be set forth in or apparent from the following description and drawings.

IN THE DRAWINGS

FIG. 1 is a perspective view of a net-pen or cage constructed in accordance with the present invention, with its net cover removed;

FIG. 2 is a perspective, broken-away view of the cage of FIG. 1 with the net cover in place;

FIG. 3 is a cross-sectional view taken along line 3—3 of FIG. 2;

FIG. 4 is a cross-sectional view taken along line 4—4 of FIG. 1;

FIG. 5 is a partially cross-sectional plan view of a portion of a cage structure shown in FIGS. 1 and 4;

FIG. 10 is a perspective, partially broken away view of a cage or net-pen with algae growth-inducing means therein for feeding algae-eating aquatic animals;

FIG. 11 is a plan view, partially broken away, of the structure shown in FIG. 10; and FIG. 12 is a cross-sectional view taken along line 12—12 of FIG. 11, with a net cover.

Figure 6:
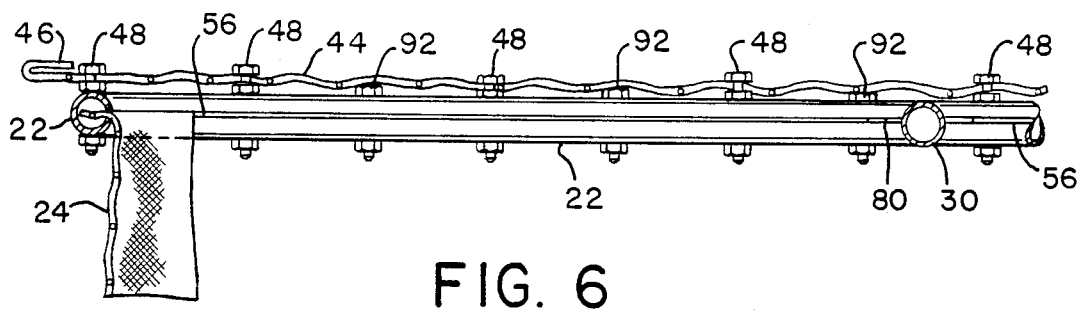
FIG. 6 is a cross-sectional view taken along line 6—6 of FIG. 2.

FIG. 1 shows a net-pen 20 which is constructed in accordance with the teachings of U.S. Pat. Nos. 4,003,338 and 4,079,698, with certain improvements which will be described herein in detail.

The cage 20 includes a frame 22 made out of bent aluminum pipe, side walls 24, preferably made out of black polyethylene extruded netting such as that sold under the trademark "Vexar" or the equivalent, and a bottom wall 26 made out of the same material. Bottom borders 28 are provided to secure the side walls and the bottom wall together.

Preferably, the border 28 is made out of a black polyethylene plastic channel into which the edges of the netting parts are inserted, with stainless steel staples holding the parts together. Preferably, the bottom border 28 has several short steel rods ("rebar") inserted in it for weight needed to keep the walls hanging straight in the water, and for stiffness to help the bottom keep its shape. The channel can be made by longitudinally slitting black polyethylene irrigation pipe.

Plastic corner guards 23 are provided at the four corners of the cage. The corner guards preferably are made of plastic channel material like that used for the bottom border 28, stapled over the upper edges of the side-wall netting at the corners of the cage, and fastened to the frame pipe 22 by means of sheet-metal screws. This leaves the corners of the frame free for use in grasping the cage.

If the netting does not come in wide enough widths, two or more panels can be joined together by means of seams such as that shown at 40 to form the bottom 26. The seams advantageously can be' formed of the same plastic channel in the same way as the borders 28, preferably without steel rods.

The cage or net-pen 20 is substantially longer in one dimension than in the other. It also is relatively large, e.g. being 8 feet in width by 20 feet long by 4 feet deep. Two crossbars 30 and 32, also made out of aluminum pipe, are connected, by means cf plates 80, between the longest sides of the cage in order to give strength and stability to the frame, and also to serve as supports for the netting cover.

Secured to the frame by means of plates 36 are 6 floats 34 made out of a block of closed cell foam plastic material such as polystyrene or preferably, polyethylene.

As it can be seen in FIGS. 3 and 4, the upper edge of the netting material forming the walls 24 extends into the interior of the frame pipe 22 through a slot 56. A bolt extends through vertical holes in the pipe and a nut is tightened on the bolt to force the edges of the pipe at the slot 56 against the netting material to grip it and hold it securely in place. A short piece 54 of finer mesh netting optionally is provided as a "feed skirt" all the way around the cage to keep floating feed particles from floating out of the cage during feeding of floating feed to fish in the cage.

As it has been noted above, FIG. 1 of the drawings does not show the netting cover for the cage 20. However, FIG. 2 does. The netting cover 42 includes one or more panels of netting, again preferably resilient plastic netting such as Vexar or the equivalent. A border 46 comprising a plastic channel stapled to the netting is provided all the way around the top in order to protect the hands of those handling the cover from the sometimes sharp edges of the netting, and also to protect the netting from getting caught and torn. The border also helps in handling the cover and adds strength and security to the cover fastening system.

In accordance with one advantageous feature of the present invention, the fastening means used to fasten the net cover 42 on top of the cage is merely an extension of some of the bolts which are used to clamp the netting into the frame pipe. Thus, as it is shown in FIG. 3, the bolt 48 which is used to fasten the netting is longer than would be necessary to merely pass through the pipe. It has a threaded portion 58 which extends to a point somewhat higher than normal. A first nut 62 is threaded all the way up to the end of the threaded portion 58, thus leaving a substantial length 66 of unthreaded shank between the nut 62 and the head 64 of the bolt. ;' nut 60 is applied to the lower end of the bolt and tightened. The pipe thus is clamped against the nut 62 to apply compression to the pipe and cause it to grip the netting of the side walls. FIG. 2 shows how the extended bolts 48 are spaced around the periphery of the cover to hold it in place.

Figure 7:
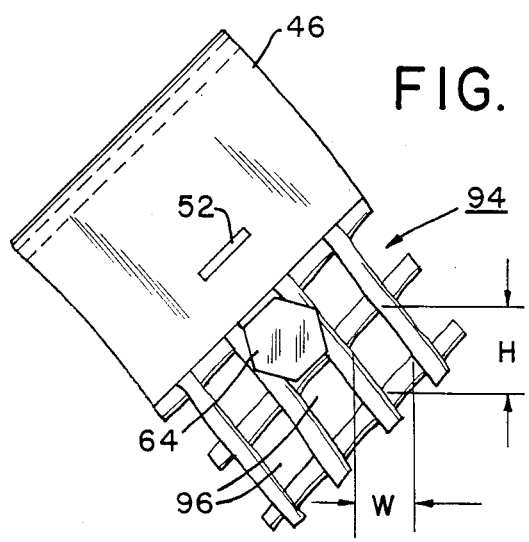
FIGS. 7, 8 and 9 are plan views, broken away, showing portions of different netting materials useable as net cover, together with the cover fastener means of the present invention.
Figure 8:
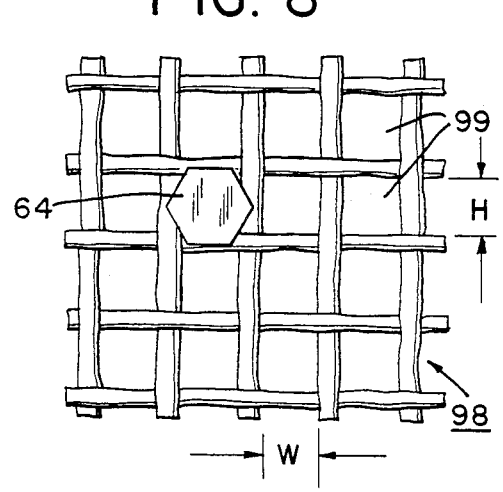
Figure 9:
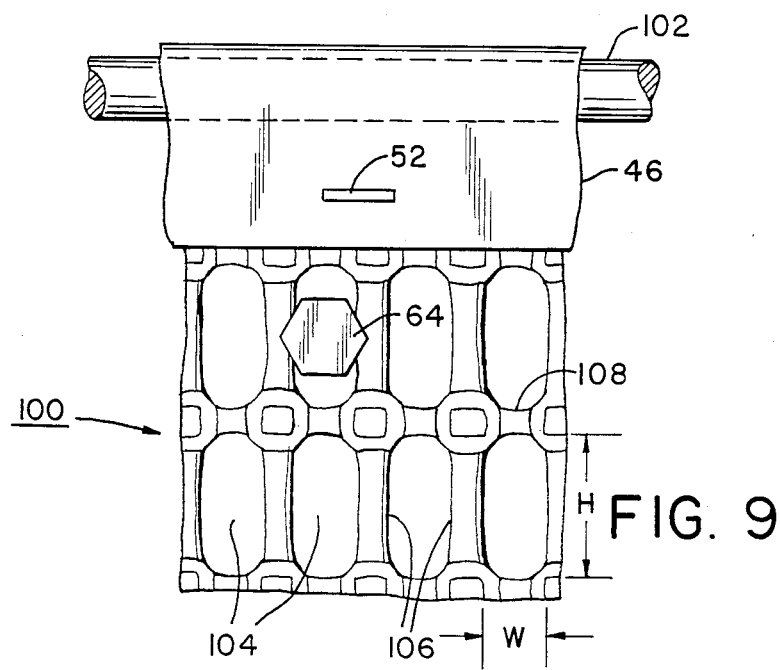

FIGS. 7, 8 and 9 show three different resilient plastic netting shapes which can be used with the present invention.

FIG. 7 shows extruded black polyethylene plastic netting such as that sold under the trademark Vexar which has basically diamond-shaped openings.

FIG. 8 shows netting with basically square openings, such as that sold by Zeigler Bros, Inc. It is believed to have a fabric core coated with black polyethylene or polyvinyl choloride (PVC).

FIG. 9 shows an expanded black polyethylene plastic netting such as that sold under the trademark "Tensar".

In each of FIGS. 7, 8 and 9, the hexagonal head 64 of the fastener bolt 48 shown in FIG. 3 is superimposed on the netting pattern to show that the head is somewhat larger than each of the holes through which the head is fitted. In fact, referring now to FIG. 9, the dimension B, the smallest distance across the hexagonal head 64 of the bolt should be greater than the narrowest dimension H or W of the netting hole in order to insure that the netting cannot be pulled off of the bolt too easily; in other words, to ensure that the cover will stay in place until it is pulled off by people.

As it is shown in FIG. 3, the top corners of the fastener bolt head 64 are rounded. Thus, as one pushes the netting down on the top of the bolt, the resilient strands around one of the holes spread outwardly slightly and allow the bolt head to pass through. The resiliency of the strands causes them to immediately snap back into place underneath the bolt head to provide, in effect, a snap type fastener to fasten the netting in place.

When removing the cover, one merely pulls up on the edge of the netting and the' resilient strands again spread to allow the bolt head 64 to pass through, without too much pulling power being required.

Thus, the cover utilizes the natural resiliency of the netting material to cooperate with the heads of bolts already used to hold the frame and side walls together to form a simple, relatively inexpensive snap-action top fastening and removal structure'.

The plastic nettings mentioned above which can be used for the top not only are advantageous in their resiliency, but they have the further advantage that they are highly resistant to sun, wind, rain and other weather elements. Thus, the tops can last for a considerable length of time.

In addition, the netting cover 42 made out of such plastic materials is considerably stiffer than net covers made out of nylon or cotton. This is advantageous in that the cover does not easily become tangled and have to be straightened out before being put back on the top of the cage.

Again, if the netting material is not wide enough to form the top in one panel, two panels 44 can be used with a seam 50 joining them.

FIGS. 7 and 9 show two different border constructions for the cover 42. In FIG. 7, the plastic channel material forming the border 46 merely encompasses the edge of the netting material. A stainless steel staple 52 is driven through both sides of the channel and the netting to hold it in place. In FIG. 9, the border 46 is the same as that in FIG. 7, except that several pieces of steel reinforcement bar "rebar" 102 have been inserted in the border to stiffen it, in the manner of the bottom border 28. The pieces should be relatively short to keep the border somewhat flexible. This may be preferred in order to give the cover dimensional stability and weight at the edges to help hold it down, and added structural strength.

Both borders 46 provide insurance against tearing the netting loose if a large force pulls the cover towards the center of the cage against the studs 48. The border will spread the force and prevent the cover from easily being torn off by such a force.

FIGS. 1, 4 and 5 show the advantageous cross bar structure of the cage of the present invention. As it is shown in FIG. 4, the cross bars 30 and 32 are pieces of aluminum pipe of the same diameter as the aluminum pipe of the frame 22. The pipe has a longitudinal slot 78 cut in each end with a plate 80 inserted into the slot.

As it can be seen in FIG. 5, the plate 80 is generally in the shape of a truncated triangle having an inner edge 82 and an outer edge' 86, with a pair of holes 84 through which bolts are inserted.

Referring to FIG. 4, the plate extends through the slot 56 in the frame pipe 22, with the inner edge 82 preferably flush against the inner wall of the pipe 22. The frame bolts 68 pass through the holes 84 in the plate 80.

Two additional holes are drilled vertically through each end of the pipe 30 and the plate 80, and clevis pins 76 are inserted through the holes so as to fasten the cross bars 30 and 32 to the plates. However, the clevis pins 76 are easily removable by hand so that both of the cross bars 30 and 32 can be removed so that virtually the entire top of the cage 20 is open. This facilitates harvesting and other operations in connection with the cage.

As it is shown in FIG. 5, the plate 80 adds a very considerable amount of lateral stiffness and strength to the frame structure. The plate 80 is very broad along the edge 82, and the bolt holes 76 can be spaced relatively far apart so as to provide a very strong brace at the joints between the cross bars and the pipe frame. However, the plates use a minimum of metal [preferably aluminum) and do not have any sharp corners for people or aquatic animals to hit when working with the cages.

FIG. 4 shows an alternative form of the post 48. Instead of a bolt with two nuts on it, the fastener consists of a bolt with an integral flange or collar at a location spaced from the head 72 of the bolt. The bolt also has an unthreaded portion 68 and a lower threaded portion onto which a nut 74 is turned. The bolt 68 with the flange portion 70 shown in FIG. 4 is advantageous in that it does not require the labor required to apply a separate nut to the bolt, and does not require threads running for as great a distance on the bolt as in the embodiment shown in FIG. 3.

Still referring to FIG. 4, the end portions 88 and 90 of the cross bars 30 and 32 are cut and beveled so as to mate well with the outer portion of the pipe frame and to give clearance for the material of the side walls 24 to emerge from within the pipe.

Although the location of the plate 80 in the slot in the pipe 56 and a separate slot 78 in the ends of each cross bar is neat and strong, it may be preferred, in order to save on labor costs, to locate the plate 80 on top of the pipes 30 and 22.

As it is shown in FIG. 6, not every one of the fasteners used to clamp the netting into the slot 56 in the frame pipe 22 need be used to fasten the cover. In fact, with frame bolts typically being spaced around 6 inches apart, every other frame bolt, or every third bolt, etc. can be used to fasten the netting on, as it is shown in FIG. 6. Even wider spacings are feasible due to the use of the border 46. In fact, if one uses a stiffened border of the variety shown in FIG. 9, it may be possible to space the top fastener bolts 48 rather widely apart.

It should be understood that the principles of the invention can be utilized with other shapes and types of netting than those shown and described herein. Also, the border 46 on the cover is desirable, but not essential.

The cross bars are advantageous in large cages or net-pens in that they provide a support surface for the central portions of the large netting cover which otherwise might sag in the middle.

In a preferred embodiment of the invention, illustrated in FIG. 7, a common plated or stainless hex-headed cap screw, ¼-20 by approximately 1½" had a nut threaded to the end of the threaded portion. The minimum width B across the hexagonal head 64 was approximately 7/16 inch.

The netting 94 shown in FIG. 7 has openings 96 designated as "½ inch". That is, the netting is called "½ inch mesh netting" by the manufacturer. Actually, the dimension H is approximately ½ inch, but the width of W of each hole is no more than about ⅜ inch on the average. The mesh easily can be pushed onto the bolt head and snaps and holds securely, and yet can be easily removed.

Similar results are obtained with the square mesh material 98 shown in FIG. 8, in which both the height H and the width W of the square holes 99 are somewhat less than ½ inch.

With the rectangular openings 104 in the netting shown in FIG. 9, one should be certain that the minimum width "B" across the head 94 is greater than the distance between adjacent long side strands 106.

The side strands 106 and the crossing strands 108 are formed by "expanding" the material; that is by slitting sheets of material and pulling them apart in two directions to form stretched strands 106 and 108.

It should be understood that other shapes of bolt heads are useable in accordance' with the present invention. In fact, the enlarged heads 64 need not be bolt heads at all; all they need to be is enlargements. They can be spherical, oval or etc., and can have virtually any desired shape. However, it is advantageous that hexagonal-headed bolts work admirably both as netting side wall fasteners and as parts of a relatively inexpensive snap fastener for the netting cover.

Not only is the cover 42 easy to put on and remove, it uses, as part of a snap fastening system, the netting structure which already is present. The numerous holes in the netting makes the cover easy to put on, and also reduces wear and tear on any one netting hole, since different holes can be used from time to time, for insertion of bolt heads.

FIG. 10 is a perspective view of a net-pen or cage 110 which is smaller than that shown in FIG. 1. Typically, it might be 4 feet by 4 feet by four feet deep, but can be larger or smaller, as desired.

The cage 110 is shown in FIG. 10 without a cover. However, it is intended that such a cover be used, and one is shown in FIG. 12. In fact, a net cover is used to advantage in the invention in that it admits sunlight helpful to the growing of algae.

The cage 110 includes a pipe frame 112 whose ends are joined by a coupling 114. Two floats are secured by means of plates 118 to the frame bolts along two opposite sides of the cage. The side walls 24, the bottom wall 26, and the bottom border 28, and the corner guards 23 all are given the same reference numerals in FIG. 10 as in FIG. 1 to indicate that their construction is essentially the same, except for size.

A portion of the netting in the front of the cage has been broken away in FIG. 10 to show portions of an algae-growing panel array 120 which is mounted in the cage. The array consists of seven vertical panels 122 of black polyethylene plastic netting material which are parallel to one another and about 6 inches apart.

Preferably, the side walls 24 and the bottom 26 of the cage are made out of the same black polyethylene netting as the panels, although the mesh size for the side wall netting should be larger than that for the panels in order to promote water flow through the side walls and bottom.

Referring to FIG. 11, each panel 122 is hung from a hanger formed by a single wire 124 bent in a re-entrant or zig-zag pattern and extending back and forth between two side support members 128 and 130 made out of plastic channel material like that used for the borders 28, with a steel rebar stiffener 134 inside. The panels are hung from the hangers 124 by means of plastic clips 126 which preferably are merely short sections (or longer sections, if desired) of plastic channel material like that used for the borders and for the members 128 and 130. As it is shown in FIG. 12, one or more staples 142 are used to staple the netting and the channel 126 together so that the panel 122 hangs from the rod 124. Preferably, the wire or rod 124 is made out of a corrosion-resistant material such as stainless steel or galvanized steel.

Referring again to FIG. 11, one end 136 of the wire 124 is bent into a L shape, and staples 132 are stapled around the end 136 so that it is well anchored in the structure. The internal bent portions 140 and 138 of the wire are stapled in place by means of other staples 132. The stiffener rods 134 stiffen the entire structure. Thus, the structure 120 is a relatively inexpensive yet integral unit which can be lifted in and out of the cage as desired.

As it is shown in FIG. 12, the outer edges of the channel members 128 and 130 rest against an inner edge of the frame pipe 122. If desired, a further support 144 consisting of a piece of black polyethylene plastic material clamped in and extending out of the slot 56, can be provided as a support for the assembly 120. The part 144 is shown in dashed outline because it is optional.

Attached along the bottom edge of each panel 122 is a plurality of weights 123 such as those which are used on the bottoms of fish nets to weigh them down. This holds the panels 122 straight. Even high density polyethylene sometimes has a density less than that of water and might tend to float. The weights keep this from happening.

Alternatively, a piece of black plastic channel with a rebar insert can be attached along the full length of the bottoms to keep the bottom borders straight. This may be preferable in cases where lead may endanger the health of the animals.

The structure of the assembly 120 as shown in FIG. 11 is very strong and resistant to unwanted bending, despite the fact that it is light weight and made of corrosion-resistant materials.

It has been found that black polyethylene netting such as that sold under the trademark Vexar is an excellent material on which to grow algae. Usually it is considered to be a nuisance. However, In accordance with the present invention, algae grows on both the walls of the cage and the panels in the cage. Animals in the cage can graze on the algae on the cage walls and the panels. The animals which can be grown in the cage include molluscs, crustaceans and fish. For example, conch can grow in the cage. For this purpose, the bottom edges of the panels 122 are positioned near the bottom of the cage so that the conch can climb up the panels and graze on the algae. Sea urchins can be grown in the cages also. Both animals are valuable as food for humans and animals. Some lobsters also eat algae, and also feed on the conch. In particular, the langouste or warm water lobster is preferred for this purpose.

It is believed that crayfish, certain species of shrimp, tillipia, white amur, and other plant-eating fish also will eat the algae. They can swim between the panels and graze on the algae there as well as on the side walls of the cage.

In accordance with another aspect of the invention, the removeable panel assembly 120 can be used in the water outside of the cage to grow algae. The panels can be supported with the panel 122 immersed in the water by means of floats, docks or other structures. When the algae growth on the panels 122 is sufficient, and when the algae growth on the panels already in the cage has been depleted by the animals, then the depleted assembly 120 is removed and the one loaded with algae is placed in the cage for the animals to feed on. Thus, by this simple procedure, the animals can be fed a substantial quantities of algae without having to gather it and scrape it off of other surfaces, as has been done in the past. Of course, if even greater quantities of algae are desired to fed, they can be gathered elsewhere by prior techniques and put into the cage with the animals.

It should be understood that other shapes can be used for the panel. If it is advantageous in building the assembly, for example, a continuous panel can be woven back and forth within the confines of the cage to provide a maximum amount of algae-growing surface area.

It can be seen from the foregoing that the objects of the invention have been met. A simple, relatively lightweight, easy to handle, and durable net-pen cover is provided with simple snap-on fastener means which makes it easy to take off and put on, and yet secure in position on the cage. The cage has easily removeable cross bars which strengthen the structure and support the net cover, and yet can be removed and replaced easily for stocking or harvest, etc.

The feeding of algae-eating aquatic animals is greatly facilitated by the provision of algae-growth supporting panels in the cage. The growth of algae outside the cage and transfer into the cage by merely replacing modular panel assemblies is a great labor and time-saving device.

The above description of the invention is intended to be illustrative and not limiting. Various changes or modifications in the embodiments described may occur to those skilled in the art and these can be made without departing from the spirit or scope of the invention.

What is claimed is:

1. A cage for containing aquatic animals, said cage comprising, in combination, a bottom wall, side walls joined to said bottom wall to form aquatic animal-retaining enclosure, framing means for framing an opening to said enclosure, a plurality of studs extending from said framing means at spaced intervals, each of said studs having an enlarged portion at a location spaced from said framing means, a cover for said opening, said cover including netting made of resilient strands forming a plurality of holes, the size of each of said holes being smaller than said enlarged portion on each of said studs, whereby said cover can be secured to said frame by forcing said enlarged portion of each of a plurality of said studs through one of said holes, said cover including a strengthening border extending along opposite edges of said cover and near said studs.

2. A cage as in claim 1 in which said netting is a resilient plastic netting with crossed strands giving a polygonal shape to each of said holes.

3. A cage as in claim 2 in which said shape is selected from the group consisting of diamonds, squares and rectangles.

4. A cage as in claim 1 in which said framing means includes a frame member with spaced fasteners fastening said side walls thereto, the ends of at least some of said fasteners extending outwardly from said frame to form said studs.

5. A cage as in claim 4 in which said fasteners are bolts and said enlarged portions comprise the heads of said bolts.

6. A cage as in claim 5 including stop members on said bolts for preventing them from penetrating more than a predetermined distance into holes in said frame member.

7. A cage as in claim 6 in which said frame member is an elongated hollow metal member with a slot, said side walls being made of netting material, one edge of said walls protruding into said hollow metal member through said slot, each of said bolts extending through said metal member and having a nut threaded onto one end of said bolt to clamp the edges of said pipe at said slot onto said one edge of said side walls by compressing said metal member between said stop member and said nut.

8. A cage as in claim 1 in which said netting is extruded black polyethylene netting, and including a border secured to the edge of said cover outside of said frame.

9. A cage as in claim 6 in which said stop members are nuts threaded onto the threads of said bolt to a position adjacent said head.

10. A cage as in claim 1 including float means secured to said framing means, said framing means including a frame member with opposed side portions and at least one cross bar fastened between said side portions, and hand-releasable fastening means for fastening said crossbar in place.

11. A cage for growing algae-eating aquatic animals, said cage comprising, in combination, aquatic animal enclosure means having side walls made of foraminous netting; first support means for supporting said enclosure means in a body of water; a plurality of panels mounted in said enclosure; second support means for supporting said panels in said enclosure, said panels being made of a material conductive to the growth of algae thereon; said second support means being adapted to easily move into and out of said cage, said panels being shaped and dimensioned so as to extend near said bottom wall of said cage so that crawling aquatic animals can reach said panels to graze on the algae thereon; said second support means comprising a sinuous re-entrant shaped wire forming plural hangers, support members secured at opposite edges of the strands of said wire to secure them together, and means for securing said panels to said hangers so that said panels can hang downwardly, said support members comprising a plastic channel member stapled over said edges.

12. A cage as in claim 11 in which said material and said side walls comprise polyethylene netting.

13. An aquatic animal cage comprising, in combination, an aquatic animal holding enclosure, a frame defining an opening to the interior of said enclosure, a plurality of studs extending out of opposite side of said frame, a netting cover for said opening, said studs being adapted to pass through the holes in said netting and hold said cover on said frame, said netting cover having a strengthening border extending along opposite ones of its edges, said cover being adapted to cover said opening with said studs extending through holes in said netting at opposite sides of said frame adjacent to said border.

14. A cage as in claim 13, said frame comprising an elongated hollow frame member with a slot along its length,
- side wall netting forming side walls of said enclosure the top edge of said netting being located inside said frame member and extending out through said slot,
- netting forming a bottom wall secured to said side walls,
- said studs comprising frame fasteners extending through said frame member at spaced intervals and clamping the edges of the frame member at said slot onto said side wall netting,
- each of said frame fasteners having a shank and an enlarged head, said shank and said enlarged head extending outwardly from said frame member, with said enlarged head being spaced from said frame member.

15. A cage as in claim 14 in which said netting cover is made of resilient strands and said holes are smaller than said enlarged heads, each of said fasteners having a stop spaced from said head.

16. A cage as in claim 13 in which said netting comprises a resilient plastic netting and said border is a relatively stiff but flexible channel fastened to the edges of said netting.

17. A cage as in claim 13 in which said holding enclosure is made of the netting and is secured to said frame, and in which each of said studs comprises an enlarged end of a fastener used to secure said netting enclosure to said frame.

18. A cage as in claim 13 including at least one crossbar spanning said opening and secured to said opposite sides of said frame adjacent said cover so as to support said cover.

* * * * *